3,339,113
ELECTRIC CONTROL SYSTEM WITH MEANS FOR ADJUSTING POTENTIAL OF ACCIDENTAL GROUND
Bert J. Couch, 29 Harrison St., Oak Park, Ill. 60304
Filed May 18, 1965, Ser. No. 456,779
5 Claims. (Cl. 317—18)

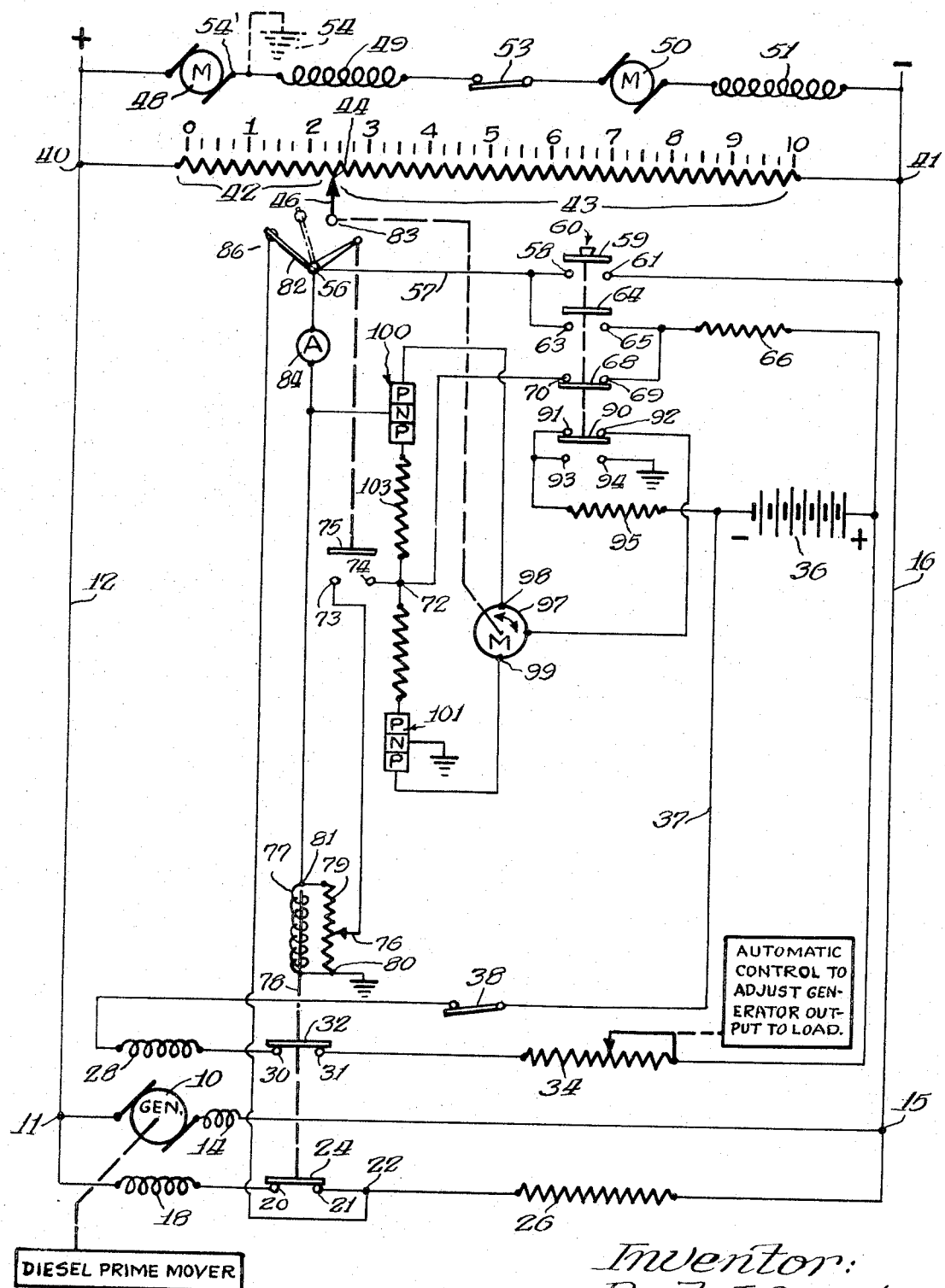

ABSTRACT OF THE DISCLOSURE

A switching system and potentiometer arrangement is provided for use in the electric power system for electric locomotives and the like. The normal ground potential for such a system is about midway between the two extreme potentials. In the event that an accidental ground occurs at a location whose potential is normally different from that of the normal ground, the system will be disabled by a circuit breaker. In order to resume operation, switching means and potentiometer provide for changing the potential of the normal ground to a value corresponding to the operating potential of the point where the accidental ground occurs. By virtue of this arrangement, the electrical system can be operated as an emergency measure and if the accidental ground does not have too low a resistance, such emergency operation can continue and still provide substantial protection against damage resulting from a second accidental ground.

---

This invention relates to an electric control system and has particular application to the control system for electric motors and generators used in locomotives.

A large number of electric locomotives have diesel engines coupled to electric generators through gearing or hydraulic coupling means. The locomotive generator, in turn, is electrically connected to one or more electric motors for driving the locomotive wheels. The locomotive control acts on the generator system principally and the electric power thus generated is fed to the locomotive motor system. The control is such that say upon starting a locomotive from rest, the throttle will act upon the generator system to feed electric power to the motors.

Elaborate means are provided for feeding back from the motor system information to regulate the generator system so that the generator output conforms to the instantaneous requirement of the motor system. Thus, the load on a locomotive motor system starting from rest will depend upon the number of cars to the train, grade conditions, etc. so that the power requirements for the motors may be different for different conditions. Such load control means are well known.

Generally the electrical system is designed to operate at about 600 volts, direct current (the exact value and nature of current are not important for the present invention) with the entire electrical generating and motor portions of the system electrically insulated from ground. Ground refers to the metal frame, etc., of the electrical components. Like most electrical equipment of substantial value, an electric locomotive is provided with a circuit breaker for opening connections in the event of short circuits or other dangers in the electrical part of the system.

The circuit breaker for the electrical system of a locomotive includes an operating winding which controls breaker contacts for circuit control. The breaker winding has at least two terminals, one of which is grounded. This ground will be designated as a normal ground. The winding has at least one other terminal which is connected to a point in the electrical system whose potential is normally at a predetermined value between the potential extremes of the generating system. If, as pointed out above, the generating system provides current at about 600 volts, it may be considered as having plus 300 volts and minus 300 volts with reference to an arbitrary zero ground. As a rule such other breaker winding terminal connection point in the system is normally about half way between the voltage extremes and this connection point is grounded through the breaker winding. If the electrical system is in good condition and operating normally, no current can flow through the breaker winding. This is true irrespective what point in the electrical system is assumed as ground. The absence of current flow is due to the fact that the system has only one point grounded and current has no place to go. However, if the entire system develops an accidental ground which is not symmetrically located as far as potential is concerned; then a short will be created where current can flow between the normal ground and accidental ground. Such current flow will be through the breaker winding and result in breaker operation.

Accidental grounds may occur in any part of the electrical system. In most instances such grounds are not dead shorts (having less than about 5 ohm resistance) but instead have higher resistances. Due to high inductance in the system, when testing for grounds, a minimum value of about 1 megohm is maintained. A ground of the order of about 10,000 ohms or less will usually cause breaker operation and in effect disable the locomotive.

In accordance with the present invention, means are provided for changing the electrical potential of the normal ground with respect to the locomotive electrical system so that it is substantially equal to the electrical potential of the accidental ground. This prevents any difference of electrical potential between the normal and accidental grounds and generally permits a circuit breaker to remain closed. If the accidental ground has a resistance which is not dangerously low, then further locomotive operation can take place without serious impairment of breaker protection against additional accidental grounds. If the accidental ground is dangerous (indicated by the new system disclosed here) then further locomotive operation is not advisable since the breaker system will be rendered inoperative to detect additional accidental grounds.

A further feature of the present invention is that the approximate electrical location of an accidental ground is indicated. In addition, the invention provides an indication of the seriousness of the ground, in terms of whether breaker protection against added accidental grounds is possible.

For a complete description of the invention reference will now be made to the single figure in the drawing illustrating a motor control system embodying the present invention.

A generator supplying electric current for driving motors for a locomotive is illustrated as having armature 10 driven by a suitable prime mover such as a diesel engine or the like. Armature 10 has one terminal connected to junction point 11 on power line 12 and has its other terminal connected through field winding 14 to junction point 15 on power line 16. Field winding 14 is one of a number of windings forming part of the generating system. Such generators have a multiplicity of field windings and as a rule are of the compound type. The exact nature of the generating system is not important.

An additional generator field winding 18 is connected between line 12 and breaker contacts 20 and 21 to junction point 22. Breaker contacts 20 and 21 are connected together for normal running operation through movable contact 24. Junction point 22 is connected through load resistor 26 to line wire 16. Neither of the line wires is grounded.

For the purpose of starting generator operation, auxiliary field winding 28 is provided. Auxiliary field winding 28 has one terminal connected through overload breaker contacts 30 and 31 of switch section 32 to rheostat 34 and thence to one terminal, here illustrated as positive, of battery 36. The negative terminal of battery 36 is connected through wire 37 and switch 38 to the remaining terminal of auxiliary field winding 28. Rheostat 34 is controlled by the load on the electric motors and has its resistance reduced with increased load. This control is well known on such electric locomotives.

Assuming that the prime mover is driving armature 10, upon closure of switch 38, and assuming that breaker contacts 30 and 31 are closed, battery 36 will energize auxiliary field winding 28. This will start generator operation in armature 10. Further control of generator action is by rheostat 34. As an example, battery 36 may be a 64 volt battery while the normal direct potential between wires 12 and 16 under normal operating conditions will be substantially 600 volts.

Line 12 is connected to junction point 40. Line 16 is connected to junction point 41. Between junction points 40 and 41 is one continuous resistor part of a potentiometer. This resistor has portions 42 and 43 which are determined by point 44 where wiper 46 engages. In practice, resistor portions 42 and 43 may have a total resistance of about 2,000 ohms.

Connected between points 40 and 41 are electric motors 48 and 50 each including field windings 49 and 51. The two motors are of the series type and are connected through switch 53 between line wires 12 and 16. Switch 53 is part of an electrical switching system whereby parallel connections of the motors is made possible. For present purposes it is closed at all times. An undesired and accidental ground 54 is illustrated as occurring at point 54' somewhere along part of motor 48. It is understood that this accidental ground can be anywhere along the two motors. Motors 48 and 50 are coupled to loads which, in the case of an electric locomotive, would be drive wheels.

Wiper 46 of the potentiometer is connected to contact point 83 which can be connected through switch 82 to junction point 56. Junction point 56 is connected by wire 57 to switch terminal 58 cooperating with movable contact 59 of switch section 60 forming part of an emergency test gang switch. Movable contact 59 of switch section 60 also cooperates with contact 61 which is connected to line wire 16. Fixed contact 58 of test switch section 60 is also connected to fixed contact 63 of test switch section 64. Switch section 64 has fixed contact 65 connected through resistor 66 to the positive terminal of battery 36. Test switch sections 60 and 64 are normally open. The gang test switch also has normally closed switch section 68 having contacts 69 and 70. Contact 69 is connected to contact 65 of test switch section 64. Contact 70 is connected by wire to junction point 72 which, in turn, is connected through contacts 73 and 74 of switch section 75, the circuit continuing to junction point 76.

Junction point 76 may, if desired, be at the midpoint of winding 77 of overload breaker 78. Instead, however, and to permit the use of a conventional breaker winding having two terminals, junction point 76 is at the midpoint of resistor 79 connected across winding 77 in dotted lines. Winding 77 in conventional systems has a resistance of the order of about 10 ohms. Resistor 79 is greater and can be about 1000 ohms or even more. Winding 77 has one terminal 80 grounded and the other terminal 81 connection point 22. Junction point 22 normally is at a potential nected to one contact of balancing switch section 82. Switch section 82 cooperates with emergency test contact 83 when testing and under normal conditions cooperates with normal switch contact 86 which is wired back to junc- about midway between lines 12 and 16. Emergency switch contact 83 is connected to the top terminal of meter 84, through ammeter 84 to junction point 56. If desired, switch section 82 can have an open or off position as shown in dotted lines.

Switch sections 82 and 75 are mechanically tied so that section 75 is closed by an actuating arm only when switch section 82 has its movable contact closed against emergency test contact 83. When switch section 82 is moved so that its movable contact closes against normal contact 86 or is off, then switch section 75 will be open.

The emergency test gang switch has switch section 90. This switch section has contacts 91 and 92 which are normally closed when no testing occurs. This test switch section 90 also has contacts 93 and 94 which are closed during testing by movement of the gang switch to off-normal position. Contacts 91 and 93 are connected together through resistor 95 to the negative terminal of battery 36. Resistors 66 and 95 may be equal. In a conventional locomotive system, using a 64 volt battery, resistors 66 and 85 may each be about 50 ohms. Contact 94 is grounded and contact 92 is connected to one of three terminals of reversible motor 97. Motor 97 has three connections and is adapted to turn in desired direction depending upon which two of the three wires are energized.

Motor 97 is mechanically coupled to wiper 46 and forms part of a wiper control for locating a balance point on resistors 42 and 43. The remaining two wires for motor 97 are 98 and 99 respectively and these are connected to the P terminals of two PNP transistors 100 and 101 respectively. The remaining P terminals of the two transistors, are connected to resistor network 103 whose midpoint is at junction 72. Transistor 101 has its N terminal grounded while the corresponding N terminal of transistor 100 is connected to top terminal 81 of circuit breaker winding 78. The values of resistors 103 and 79 should be selected so that proper transistor control action can be obtained.

The arrangement for automatic operation of wiper 46 by motor 97 can be eliminated and wiper 46 may be manually operated in case of emergency. Thus, the following circuit portions may be omitted for pure manual operation: switch sections 60 together with the connection from contact 61 to junction point 41; switch section 68 together with the connections from contact 70 to junction 72, transistors 100 and 101 together with resistors 103, motor 97 and the connections to the transistors as well as switch section 75 and resistor 79 and the midpoint connection 76; upper contacts 91 and 92 can be eliminated in switch section 90, lower contacts 93 and 94 remaining.

The same general considerations of an accidental short in the motor portion of the system tripping the breaker apply to the generating portion of the system equally well. The operation of the system is as follows. Assume that the locomotive is operating normally, then breaker 78 will be in normal position wherein switch sections 24 and 32 are closed against their respective contacts. The Diesel engine is idling or at full load and the generating system is either idling or at full load depending upon the throttle. If the generator is at full load then the motor system is operating at the corresponding load. The position of wiper 46 is not important. The test gang switch is in the up position as shown while the balancing test switch 82 is at normal (against contact 86) and switch section 75 is open. Driving motor 97 for wiper 46 (if the system is present) is idle and deenergized.

Now assume that accidental ground 54 develops at point 54'. If this ground is not at the electrical center of the generator or motor system, then the accidental ground potential differs from the normal ground potential. This difference in potential may be enough to drive current through the breaker winding and operate the breaker to open switch sections 24 and 32. This disables the electrical system (generator and motor) and the locomotive stops.

The next thing to do is to move balancing switch section 82 to Emergency where contact 83 is active. Then the generating system is started again, breaker 78 either going to normal by itself or being manually reset if the breaker is of that type. When the generator system begins to operate again, the voltage across lines 12 and 16 to the motors begins to climb from zero toward the normal 600. It is possible that breaker 78 will cut out before the balancing action provided by this invention can occur. If so, several repeats with re-closure of the breaker and generator start up may have to be made. However, with the generating and motor system in dynamic condition—the generator generating a potential and supplying current to the locomotive motor or motors which start to turn—the following balancing action quickly takes place.

Battery 36 is connected across the transistor and wiper motor, the circuit being completed as follows—36 positive, resistor 66, switch section 68, point 72, through one or other transistor, depending upon bias, through the appropriate winding of motor 97, switch section 90, resistor 95 and negative terminal of battery 36. The bias on a transistor will depend upon the ground current (between 80 and 54) going through breaker winding 77 and the direction in which such current is going through the winding. The direction of ground current will depend upon the location of accidental ground 54. As illustrated, with accidental ground in motor 48 at a positive potential with respect to electrical center point 22, then current will flow to ground 80 go and up winding 77 to terminal 81. This will result in point 76 being negative to ground and in transistor 101 being biased positively and passing current. As wiper 46 is moved along the resistor network, the relative potential between the two grounds will decrease.

It is assumed that this balancing action can occur fast enough so that the voltage across wires 12 and 16 can build up for dynamic voltage conditions to be created in the entire electrical system. As is well understood, the actual ohmic resistance of the electrical generating and motor system components is very small. For example, in a locomotive the motor armature (and generator armature) may have a resistance of as low as about .05 ohms. The fields may have resistances of about .1 ohms. To carry out measurements under static conditions would be difficult if not impossible. It is not necessary that normal 600 volts between wires 12 and 16 be reached. As wiper 46 approaches a balance point, the breaker will remain in closed (normal) condition longer and thus the system will be able to reach perfect balance as full potential conditions are attained. When balance is reached, meter 84 will show no current.

The manual balancing is done the same way by starting the generator system and moving wiper 46 to reach a balance point. For convenience, meter 84 will be a zero center type so that the direction of off-balance will be indicated. The potentiometer system can be calibrated to show where the accidental ground or its potential is located with reference to lines 12 and 16. The location can be indicated in terms of percentage of total resistance or normal potential across one or both motors. This assumes the ground is in a motor. In practice this assumption usually holds good. The same procedure may be relied upon for the generator system. A calibrated chart for motor or generator can be prepared to correlate the potentiometer scale with motor or generator ground locations. In any case, the balancing will be accomplished to provide a common potential for ground 80 and 54. The balancing test having been accomplished, the potentiometer setting can be used to locate the electrical location of the ground in the motor or generator system.

It is understood that an accidental ground in the motor system whose normal potential during operation is the same as point 22 will not show up as a rule. If such ground is suspected then the following procedure may be used to determine this. With balancing switch section 82 in balancing test position on contact 83 showing no current when wiper 46 is at midpoint on the potentiometer, wiper 46 is deliberately moved off-center manually. With the generator system operating and motors working as in balancing procedure, the breaker will open and show that the entire system has two grounds, one being at 80 and the other being at point 22 or other potential center point in the system.

The balancing test procedure has indicated an accidental ground and its location in the motor or generator system. As a rule, the generator portion of the entire locomotive power plant is well protected against weather and dirt. Usually the motors below the locomotive body are carried by the trucks near the wheels and develop grounds. The next thing to determine is the extent of the ground. As indicated previously, an accidental ground having a high resistance (for locomotives this would be greater than about 50 ohms) can be tolerated because of the present invention in spite of the fact that upon the occurrence of the accidental ground, breaker opening has resulted.

The invention results in some desensitization of the breaker system without sacrificing complete breaker protection against added accidental grounds. That such desensitization occurs is evident by the following consideration. Upon the existence of accidental ground 54, the locomotive system, if operated further, must be with balancing switch section 82 in Emergency position, even though balancing has been accomplished. Such a switch position effectively disposes accidental ground 54 in series with the parallel combintation of resistor portions 42 and 43 and all this in shunt to braker winding 77. If a second accidental ground occurs and if first accidental ground 54 is a dead short (having less than about 4 or 5 ohms resistance) then the desensitization of breaker 78 due to the balancing of the system after the first accidental ground would prevent the breaker from opening if a second accidental ground develops. It is therefore important from a safety angle to determine if the first accidental ground is serious enough to require immediate repair (this is not usually true) or can be tolerated and the locomotive proceed with the knowledge that satisfactory breaker protection still exists against a second accidental ground. In this connection it should be appreciated that potentiometer resistor 42-43 will have to carry current for operating breaker 78. Hence the resistance should be low enough so that when the system is in Emergency operation, and a second accidental ground develops, current through breaker winding 77 can pass for operating the breaker.

With the power system operating at about 600-700 volts, the potentiometer resistor should be able to carry between about ½ and one ampere. This is on the assumption that breaker 78 will operate on such currents through its windings. At the worst, wiper 46 may be near the center point of resistor 42-43 in which case portions 42 and 43 will be in shunt for breaker operating currents in case of a second accidental ground. Thus, so long as breaker 78 is responsive to current rather than potential (as a transistor for example) the potentiometer must also be able to carry such currents and not have too high a resistance so that breaker 78 is not desensitized dangerously. Too low a potentiometer resistance would waste power. In the locomotive systems in use, a resistor 42–43 can range from about 700 ohms to about 2,000 ohms. The sensitivity of breaker 78 will be a factor. A very sensitive breaker would trip on a low current, say less than about one-tenth ampere and would permit a higher potentiometer resistance. Excessive breaker sensitivity, however, is not desirable.

After the electrical system has been balanced, the generating system is shut down so that no voltage across wires 12 and 16 from the generator is provided. Switch 38 is opened. Thereupon, the test gang switch is depressed. When this is accomplished, the positive terminal of battery 36 is connected through current limiting resistor 66 and switch section 64 to the top terminal of meter 84 down through breaker winding 77 to ground 80. The transistor and wiper motor circuit (if it is present) is disabled by switch section 68 opening and switch section 90 in down position. This last section connects the negative battery terminal through current limiting resistor 95 to ground, this last named ground being a true low resistance ground to the locomotive frame and similar to low resistance ground 80 at the breaker winding. Contact 63 is connected through switch section 60 to line 16 and thence through the low resistance motors to accidental ground 54. Thus, breaker winding 77 is shunted by accidental ground 54. The ohmic resistance of the rest of the motor and generator system is so low that for present purposes it is immaterial.

The arrangement of battery current limiting resistors 66 and 95, battery voltage and breaker winding 77 resistance is such that if accidental short 54 has a resistance which is low enough to prevent breaker 78 from tripping on the battery current then accidental short 54 is too dangerous (has too low a resistance) for the locomotive to proceed. This will indicate that a second accidental ground may fail to operate breaker 78.

For example, if breaker winding 77 has an ohmic resistance of say 10 ohms, then a shunt resistance of 50 ohms due to an accidental ground would result in an equivalent resistance of 8.33 ohms. Resistor 79 is so high as to be disregarded. One-half the IR drop across winding 77 is required for transistor bias operation and this may be less than about .01 volt for many transistors.

Some breakers in use have a winding resistance as low as about 1.5 ohms. In all cases, however, a minimum potential across the winding terminals is necessary for breaker operation. If the winding has a resistance across it which is practically a short, then the potential across the winding can not rise to a value required for breaker operation. In general, the resistance due to an accidental short which is effectively in shunt to the breaker winding should not, for system operation, be so low that breaker sensitivity is dangerously reduced. As an example, if locomotive operation is to be resumed, the resistance of the first accidental short should be at least about five times the resistance across terminals 80 and 81. An exact figure is difficult to give since it depends upon the sensitivity of breaker 78. In addition the high inductance of the motor and generator systems may dictate an even higher figure than 5, particularly if winding 77 has an unusually low resistance.

It should be noted that during the short circuit sensitivity test with the gang switch, switch section 82 may be at normal or Emergency or Off position. In any event during this test, current through the breaker winding will go through meter 84. This meter may be marked with a red line to show the minimum current which is necessary for breaker operation. During this sensitivity test, the breaker should be in untripped or closed position as shown. Hence, the meter reading as well as the breaker operation will indicate the nature of the accidental ground insofar as its resistance is concerned. In fact, with the meter marked to show minimum current for the operation of the breaker, it is not even necessary to set the breaker to a closed position, if that is not the normal position. The meter reading can be used as a check on the breaker to insure proper breaker operation.

It is thus clear that the operation of the protective control involved in the present invention does not require delicate or sensitive equipment. It is possible to disconnect the potentiometer resistor from point 40 or 41 for normal running conditions and only use it for Emergency test and Emergency running. In such case, the potentiometer resistance can have a value lower than where it is permanently connected. Thus, for a 600–700 volt system, the potentiometer resistor could be down to about 300 or 400 ohms.

While the invention has been illustrated and described in connection with a locomotive having electrically coupled generating means and motor means, it may be used where locomotives are utilized in mine cars, in marine electric motor and generator systems and elsewhere making testing difficult. Essentially the invention relies upon providing a potential bridge rather than a resistance bridge and changing the potential of a ground in a system that is essentially ungrounded to the potential of an accidental ground where such system has protecting means between ground and a point in the system.

Meter 84 indicates the amount of current flowing through the breaker winding. It may be connected across the winding to indicate voltage. If connected in this fashion, the meter may be replaced by a suitable lamp which will light if a suitable voltage across the winding exists.

The qualitative test means for determining the nature of the accidental ground (low or high resistance) depends upon applying a low voltage power source across the breaker winding and accidental ground in shunt thereto to see if the breaker does or does not trip. It is possible to make the test with the accidental ground, breaker winding and low voltage power source all in series. In such case, a low resistance ground would cause the breaker to trip whereas a high resistance ground would prevent the breaker from tripping. The circuit for accomplishing this would require that the top terminal of meter 84 be disconnected from wire 57 and from wiper 46 and instead be connected to contact 94 of switch section 90, which contact 94 is disconnected from ground. In such case battery 36, upon operation of the gang switch (the generator system is down, switch 38 is open and breaker 78 is in closed position, switch section 82 must be in normal position so that switch section 75 is open) applies potential from the positive terminal to the top terminal of meter 84 and thence to accidental ground in series with the breaker winding, resistor 79 is still in shunt to winding 77 but may be disregarded for practical purposes. By having meter 84 in this series arrangement, the total resistance of load resistors 66, 95, accidental ground resistance is known, the accidental ground resistance may be roughly determined. The scale of meter 84 may be calibrated to read the resistance of accidental ground 54 by setting an arbitrary meter zero value to a dead short. Generally such an ohm meter arrangement is not precise for measurement. However, an accidental short having a resistance greater than about 5 or 10 ohms can be measured.

The most valuable determination in either series or parallel arrangement is whether the breaker sensitivity is sufficient for operation against a second accidental ground.

The test circuit arrangement with load resistors 66 and 95 and battery 36 having a voltage of 64 volts together with a breaker having winding resistance of about 10 ohms or less when used on power system whose normal operating voltage is between about 600 and about 700 produces satisfactory test conditions. In a different system having different circuit constants and voltages, it would be necessary to engineer the load resistors to obtain the same breaker currents under test conditions as in actual system operating conditions. It must be remembered that the test voltage (64 in this instance) is much less than the normal system voltage. The breaker winding remains the same in test and under actual usage. Hence, the test conditions insofar as voltage applied across winding 77 is concerned should duplicate actual system operation. The IR drop in the various resistors for test voltages must be considered in order to simulate actual voltage and current magnitudes in the breaker winding during system operation. The actual current through a breaker winding must be the same during system operation and test if tripping action is to be determined. For the above reasons, the switching during testing when the system is down need not take into account the value of potentiometer resistance. This is taken into account by the values of load resistors 66 and 95 and the value of 64 volts for battery testing.

One factor in the possible precision requirements of a system embodying the invention relates to the lowest possible potential difference between ground 80 and the next accidental ground, whether it be the first or second accidental ground. Obviously if a new accidental ground occurs at a point in the system whose potential is close to that of ground 80, no great damage can occur. However, if the potential difference is great enough to cause damage, then it should be protected against. Accordingly, potentiometer resistor 42–43 should be low enough and the IR drop across winding 77 for breaker operation should be so selected that a minimum harmful potential difference between ground 80 and some accidental ground which is expected to occur, should permit breaker operation during system operation. Thus as a practical example, if during normal system operation, ground 80 and some accidental ground (it may be 54 or a new one) have a potential difference between them of 10 volts, then assuming the accidental ground is a dead short having about 5 ohms or less resistance and that breaker winding 77 is 10 ohms resistance, the current flowing through winding 77 will be 10 volts divided by 10 plus say 5 ohms which will come to ⅔ amperes. The breaker can be set to operate at this current. If the accidental ground has a greater resistance, the 10 volt difference may not trip the breaker.

Thus, considerable leeway in the design of the system is possible depending upon how small a difference between ground potentials is desired for breaker operation. During sensitivity testing with the gang switch and the power system shut down, the desired potential and current operating conditions for threshold breaker operation will be duplicated insofar as voltage applied to ground 80 and breaker terminal 81 are concerned. In all test procedures, except when meter readings are relied upon, it is understood that breaker 78 will normally be in closed or untripped position so that required test current through the winding will trip the breaker.

What is claimed is:

1. An electrical system having two power lines across which there normally exists a difference of potential during system operation, said system having at least one means including metallic structural parts for providing conversion between electric power and mechanical power, said conversion means being of the electro-magnetic type having normally ungrounded windings whose ohmic resistance when said converting means is in static condition is normally very low in comparison to the apparent resistance in dynamic condition when energy conversion is occurring, the difference in resistance conditions being caused principally by generator action, a grounding terminal for said metallic structural parts, electromagnetic circuit breaker means including an operating winding having two terminals and switch means wired into the system, said switch means in normal breaker condition completing system power circuits for system operation and on breaker operation opening such system power circuits for disabling said system, a permanent connection between one breaker winding terminal and said grounding terminal, a connection from said other breaker winding terminal to a point on said electrical system whose normal potential is about midway between the line voltage to establish an artificial operating ground potential, said system being susceptible to accidental grounding to said metallic structural parts at a random point in the electrical system whose normal potential may differ from the artificial ground whereby said breaker means may operate to disable said electrical system, in combination with additional means comprising a potentiometer resistance element connected across the power lines, a wiper cooperating with said resistance element for deriving a potentiometer potential, and switch means for disconnecting the other breaker winding terminal from said midway potential point on said system and connecting said other winding terminal, as an emergency connection, to said potentiometer wiper, whereby said breaker winding other terminal can have its potential adjusted by wiper operation under dynamic system conditions to the potential of an accidental ground thus establishing an emergency operating ground potential to permit emergency system operation with some protection against an added accidental ground in case where the first accidental ground has an ohmic resistance at least great enough to prevent a disabling short across the breaker winding terminals, said breaker winding being substantially shunted during emergency operation by the potentiometer resistor parts from the wiper point to the power lines and then through the electrical equipment wiring to the accidental ground, said potentiometer resistance across the power lines being great enough so that system operation can take place without disturbance to the potential to be maintained across the power line, in the absence of an accidental ground, and being low enough so that during emergency system operation, adequate breaker operating current may pass through the potentiometer network in case a second accidental ground occurs elsewhere in the system.

2. The system according to claim 1 wherein electric current indicating means are provided for indicating both intensity and polarity of current flow through said breaker winding when said switching means is in emergency condition whereby said potentiometer adjustment may be made to establish the emergency operating ground potential for said grounding terminal and accidental ground during emergency operation.

3. The system according to claim 1 wherein said potentiometer includes indicating means for providing a reading useful in the balanced potentiometer emergency position for generally indicating the location of the accidental ground with reference to one or the other power line.

4. The system according to claim 1 wherein servo means are provided for operating said potentiometer to attain its desired balanced potential adjustment, said servo means including means for energizing a potentiometer actuating motor in either of two directions and sensing means responsive to the polarity and magnitude of any potential difference between said two grounds for determining the direction of motor rotation.

5. The system according to claim 1 wherein means are provided for making a preliminary test determination of the general nature of an accidental ground, said means being operative only when the system is not operating and has been switched to emergency, said means comprising a source of electric power for providing a voltage substantially lower than is normally present across the power lines and is insufficient for system operation but is great enough to cause breaker operation when said low voltage power source is connected across the breaker winding, and switching means for connecting said low voltage power source across the winding of said circuit breaker when said system is in emergency condition, said breaker winding when connected in emergency being shunted by two parallel circuits, one such parallel circuit extending from the potentiometer wiper through one part of the potentiometer resistance, thence to one power line and through windings to the accidental ground, the other circuit going from said potentiometer wiper through the remaining part of the potentiometer resistance to the other power line and thence through windings to said accidental ground, the possibility of emergency operation of said system with benefit of substantial circuit breaker protection being indicated by whether such circuit breaker operates when said test voltage is applied, the failure of said circuit breaker to operate under such test conditions indicating that emergency operation with breaker protection is possible.

References Cited

UNITED STATES PATENTS

| 1,329,432 | 2/1920 | Rogers | 324—52 |
| 2,120,391 | 6/1938 | Butterfield | 324—52 |
| 2,855,547 | 10/1958 | Shepherd | 317—18 |
| 2,883,610 | 4/1959 | Brown | 317—18 X |

MILTON O. HIRSHFIELD, *Primary Examiner.*

R. V. LUPO, *Assistant Examiner.*